May 24, 1927.
T. C. LEAKE
1,630,089
TRACK CHAIN FOR TRACTORS
Filed Oct. 10, 1921   2 Sheets-Sheet 1
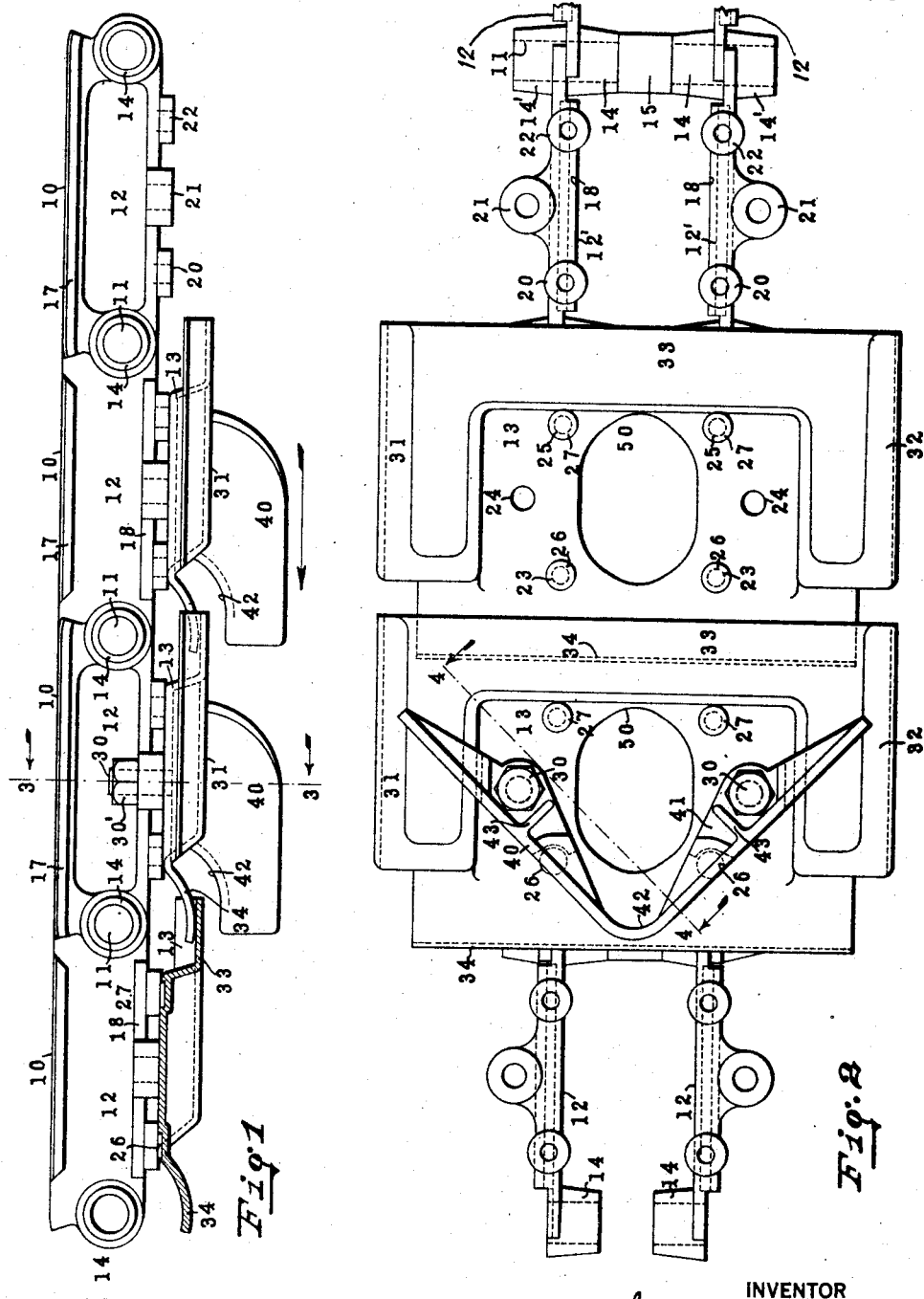
INVENTOR
Thomas C. Leake,
BY
Duell, Warfield & Duell
ATTORNEY May 24, 1927.
T. C. LEAKE
1,630,089
TRACK CHAIN FOR TRACTORS
Filed Oct. 10, 1921  2 Sheets-Sheet 2
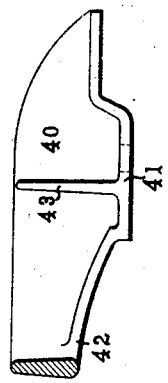
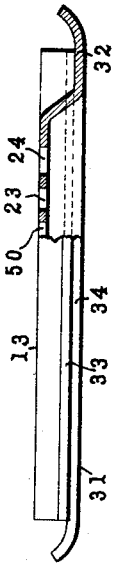
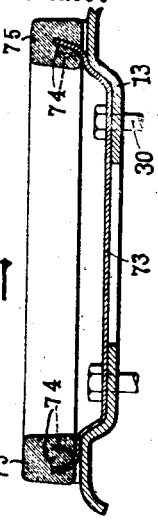
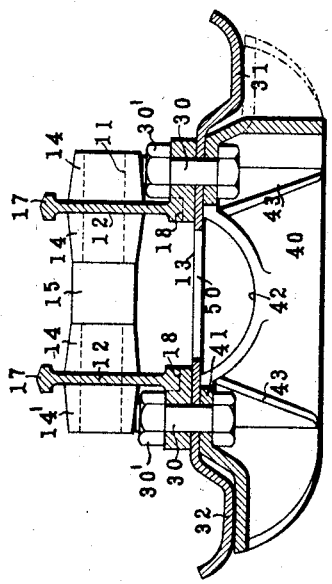
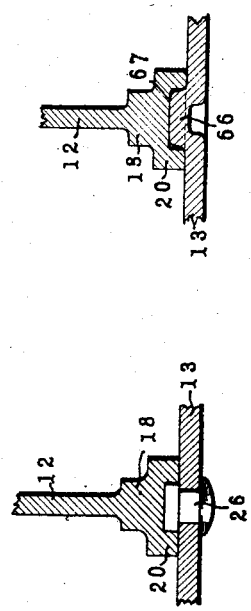
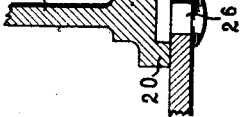
INVENTOR
Thomas C. Leake,
BY
Duell, Warfield & Duell
ATTORNEY Patented May 24, 1927.

1,630,089

UNITED STATES PATENT OFFICE.

THOMAS C. LEAKE, OF NEW YORK, N. Y., ASSIGNOR TO BEAR TRACTOR CORPORATION OF AMERICA, OF NEW YORK, N. Y., A CORPORATION OF DELAWARE.

TRACK CHAIN FOR TRACTORS.

Application filed October 10, 1921. Serial No. 506,639.

This invention relates to track chains for tractors of the endless chain track laying type, and more particularly to the link construction employed in the chain.

This invention has for its general object an improved construction and arrangement of parts which is strong and durable, efficient, and readily manufactured.

A more specific object of this invention is to provide improved side plates, tread plates and grousers which are so formed that the chain may be assembled therefrom with substantially a minimum of shop labor.

Still another object is to provide an improved construction of the grousers themselves which produces substantially maximum tenacity to the ground and at the same time has substantially minimum resistance in being applied to or removed from the ground during the travel of the tractor.

Other objects and advantages will be in part specifically pointed out hereinafter and in part obvious from the constructions described.

The invention accordingly consists in the features of construction, combinations of elements and arrangement of parts which will be exemplified in the construction hereinafter set forth, and the scope of the application of which will be indicated in the appended claims.

For a more complete understanding of the nature and advantages of this invention reference should be had to the following detailed description, which describes the best illustrative embodiments of this invention at present known to me, taken in connection with the accompanying drawing in which:

Figure 1 shows, in side elevation, a portion of a track chain constructed to embody this invention, parts being removed in order to facilitate the illustration;

Figure 2 shows a plan view of the construction shown in Figure 1;

Figure 3 is a vertical section through a track link taken on the line 3—3 in Figure 1;

Figure 4 is a section of a grouser taken on the line 4—4 in Figure 2;

Figures 5 and 7 are fragmentary views showing further details of the track construction;

Figure 6 is a fragmentary sectional view corresponding to Fig. 5 but showing a modification; and Figure 8 is a section showing a modified form of tread plate.

In tractors of the self-laying track type it is customary to provide a track frame to carry the chain track. The chain track, as a rule, embraces a driving sprocket at one end of the track frame and one or more idlers disposed along the frame.

Referring now to the drawings, the track is shown as composed of a plurality of articulated links, each link 10 as shown in Figure 1 being pivoted to the adjacent link at either end by means of a pivot pin 11. Each link is composed of two side plates 12 or 12′ and a tread plate 13. The side plates of two successive plates differ in the arrangement of the bosses 14 which are arranged to receive the pivot pins 11. As shown in the fragmentary side plates at the extreme right of Figure 2, the plates 12 have inwardly projecting bosses 14 which fit snugly against the enlarged middle or shoulder portion 15 of the pivot pin 11. The side plates 12′ succeeding the plates 12, as shown at the right of Fig. 2, are provided with outwardly extending bosses 14′ which are adapted to be aligned transversely with the inwardly extending bosses of the plate 12 for the reception of the pivot pins 11. It will thus be understood that the side plates 12 of the flexible traction member forming a pair are provided with inwardly extending bosses 14, while the adjacent side plates 12′ are provided with outwardly extending aligning bosses 14′.

As seen from Figure 1, each side plate is provided with a track rail 17 shown at the top of the plate in Figure 1, which provides a bearing surface as the link traverses an idler or a sprocket. At the other edge of the side plate is a plate rail 18 which is preferably arranged to provide the three annular protuberances 20, 21 and 22 which are adapted to register with corresponding openings at 23, 24 and 25, respectively, in the tread plates. Into the openings at 23 and 25 are inserted dowel-pins 26 and 27 which maintain the proper disposition of the tread plates on the side plates when once in place. This arrangement is clearly illustrated in Figure 5.

When the side plates 12 and the track plates 13 have been properly located by means of the dowel-pins 26 and 27, the construction is then ready to be finally secured together. This is accomplished in accordance with this invention by the use of but one bolt for each side plate. The bolt, as shown at 30, is passed through the opening at 24 in the track plate and the opening in the protuberance at 21, the nut 30' of the bolt being preferably applied from a position above the tread plate as shown in Figure 3.

The precise form of tread plate 13 to be employed, according to one aspect of this invention, is immaterial. The tread plate, however, should be made stiff. To this end the tread plates shown in Figures 1, 2 and 3 indicate that a ledge has been struck up about three sides of the plate. This ledge, as shown at 31 and 32, passes along two sides and across the front of the tread plate at 33 when it is in engagement with the ground. The back of the tread plate is shown as bent upwardly to provide a curved surface 34 which engages with the inside of ledge 33 on the next succeeding link.

In order to increase the traction of the track shown thus formed, when employed in the agricultural arts, it is preferable to provide them each with a grouser or ground gripping element 40. Each of these grousers, as clearly illustrated in Figures 1 and 2, comprises an independent V-shaped member having side plates converging to form a rearwardly disposed nose. These side plates form ground engaging flanges of the grouser and each is provided at the base thereof with angularly disposed flanges 41 lying in position to contact with the tread plate 13 and having openings adapted to be placed in registry with the openings 24 in the tread plate 13 for the reception of the securing bolt 30. The grousers 40 by this construction, are adapted to be secured in place also by the bolts 30; hence it is seen that each complete link of the track chain, whether with or without grousers, is adapted to be finally secured together by merely putting in place two bolts 30.

It is advantageous to form the tread plates 13 with central openings. Such openings are indicated at 50 being somewhat elongated and result in a lighter track chain than otherwise, and in addition provide passages through which mud and other matter which may accumulate in the space between the side plates may drop as the track chain travels about its frame. These openings also prevent accumulations of dirt between the angularly disposed ground engaging flanges of the grouser.

In the specific grouser construction here illustrated, more particularly shown in Figures 1, 3 and 4, the upper end part of the grouser's nose is cut away as indicated at 42, so as to provide a passage for the air which might otherwise get pocketed by the earth accumulated in the nose. This feature of the grouser permits free passage of the air and hence facilitates the self-removal of the earth and other matter which tends to accumulate in the nose of the grouser. The edge formation at 41 is preferably extended to provide a vertical rib as shown at 43, for strengthening purposes. In this way it is seen that a very rigid grouser is provided, well adapted for increasing the tractive effort of the tractor, and which provides readily for the dislodgment of any earth tending to accumulate in the nose of the grouser, and also to relieve it of the tendency to suction when working in mud.

In Figure 6 there is illustrated an alternative construction for that shown in Figure 5. The tread plates 13 are here located on the side plates 12, without the aid of dowel-pins 26. This is accomplished by merely indenting protuberances at 66 to extend up from the inner face of the tread plates 13 instead of providing holes for dowel-pins; such indented protuberances are adapted to engage with the complementary cavities 67, in the protuberances 20 and 22 on the side plates.

In Figure 8 there is illustrated an alternative arrangement in which a modified grouser is used. In this form the tread plate 13 is provided with a plate 73 having a surrounding edge provided with barbs struck therefrom adapted to penetrate a marginal envelope or tread 75 of elastic material, such as rubber. The plate 73 provides a tread securing device to secure the resilient tread to the tread plate, the bolts 30 passing through the plate to secure it in position. This construction provides a suction tread plate particularly adapted to be used in track chains designed to develop traction over relatively hard and generally smooth surfaces.

To assemble a track chain embodying the link construction of this invention, a pin 11 is first fitted into two side plates 12 having inwardly extending bosses 14. Next two side plates 12', having outwardly extending bosses 14' are slipped thereon, another set of plates 12 fitted with pins 11 being at the same time united therewith; such process being continued until the desired length of chain is produced. Tread plates 13 may now be put in place, the dowels 26 or the protuberances 66 guiding them in their proper disposition thereon. Where grousers are to be employed, they are now fitted in place so that their openings register with the openings 24 in the tread plates, the parts now being ready to be secured together by the insertion of two bolts 30 through the registering openings in each tread plate. In this manner chains of any desired length are secured together by what is substantially a single operation for each link.

It will be noted that the supporting part of the grouser forming the nose thereof is disposed directly opposite the center of the link pin 11, and the co-operating complementary edges 33 and 34 of adjacent tread plates are disposed directly between said nose and link pin. The supporting nose is therefore disposed directly below the link pin when in supporting position in engagement with the ground. This arrangement results in a more stable support for each chain link which proves advantageous in actual use. It will also be noted that the nose or apex formed by the junction of the side plates of the grouser faces rearwardly of the tractor, or in the direction of motion of the track chain as indicated by the large arrow in Fig. 1. It is therefore seen that the nose of the grouser will engage gradually with the supporting surface and be gradually embedded therein, as the chain moves downwardly over its support. This provides a cushioning effect in the gripping of the grouser with the ground and avoids shocks.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense. The invention, therefore, is to be understood as embracing such equivalent modifications as fall fairly within the spirit and scope of the appended claims.

Having described my invention, what I claim as new and desire to secure by Letters Patent is:

1. In a flexible traction tread, in combination, a link having a pair of side plates adapted for articulation with the side plates of an adjacent link, a tread plate, a cooperating lug formation projecting from the face of one of said plates, a complementary seat formation in another of the plates and being cooperable with said lug formation for positioning the tread plate on the side plate in operative position and for resisting bodily edgewise movement of the tread plate in any direction, said plates being provided also with complementary openings which are brought into registry by assembly of said lug and seat formations, and a solitary bolt for securing each of said side plates to said tread plate and being seated in said complementary openings.

2. In a flexible traction tread, in combination, a link having a pair of side plates adapted for articulation with the side plates of an adjacent link, a tread plate, cooperating lug formations on said side plate and tread plate for positioning the latter on the side plate in operative position and for resisting bodily edgewise movement of the tread plate in any direction, and a solitary bolt for securing each of said side plates to said tread plate.

3. In a flexible traction tread, in combination, a link having a pair of side plates adapted for articulation with the side plates of an adjacent link, a tread plate, spaced protuberances rising from an edge of one of said side plates and together providing a seat for said tread plate, complementary lug formations on said tread plate and certain of said protuberances and including a projecting lug and complementary seat adapted to interengage for positioning the tread plate on the side plate in operative position and for resisting bodily edgewise movement of the tread plate in any direction, another of said protuberances being provided with an opening adapted to be brought into registry with an opening in said tread plate by assembly of said lug and seat, and a securing bolt seated in said registering openings.

4. In a flexible traction tread, in combination, a link having a pair of side plates adapted for articulation with the side plates of an adjacent link, a tread plate, spaced protuberances arranged in triangular formation and rising from an edge of one of said side plates and together providing a seat for said tread plate, complementary lug formations on said tread plate and on certain of said protuberances and including a projecting lug and complementary seat adapted to interengage for positioning the tread plate on the side plate in operative position and for resisting bodily edgewise movement of the tread plate in any direction, another of said protuberances being provided with an opening adapted to be brought into registry with an opening in said tread plate by assembly of said lug and seat, and a securing bolt seated in said registering openings.

5. In a flexible traction tread, in combination, a tread plate, a side plate adapted for articulation with a similar side plate, said first mentioned side plate being provided with spaced protuberances arranged in triangular formation and rising from an edge thereof and together providing a stable seat for said tread plate.

6. An independent V-shaped grouser for flexible traction treads comprising side plates converging and uniting to form a nose, the grouser being recessed to provide a clearance opening at the upper side of said nose.

7. An independent V-shaped grouser for flexible traction treads comprising tread plates, side plates disposed at an angle with each other at least as large as a right angle and uniting to form a nose, each side plate being provided with base rigidifying and securing flanges having openings adapted to register with openings in the tread plates to receive securing bolts, the grouser being recessed to provide a clearance opening at the upper side of said nose.

8. In a track chain, in combination, a tread plate, and a grouser secured to said tread plate, said tread plate having an opening therein adjacent said grouser whereby removal of dirt accumulated by the latter is facilitated, said grouser being formed with an opening in its upper portion to facilitate removal of said dirt accumulations.

9. In a track chain, in combination, successive side plates articulated together by means of pivot pins, tread plates secured to said side plates, a grouser secured to each of said tread plates and having converging plates uniting to provide an apex, said tread plates having cooperating complementary edge portions lying between adjacent pivot pins and the apices of the adjacent grousers.

In testimony whereof I affix my signature.

THOMAS C. LEAKE.